June 13, 1972    D. GUYTON    3,669,529
OPTICAL SYSTEM FOR VARYING THE POWER RANGE AND SCALE
SPACING IN A LENS MEASURING INSTRUMENT
Filed Jan. 2, 1970
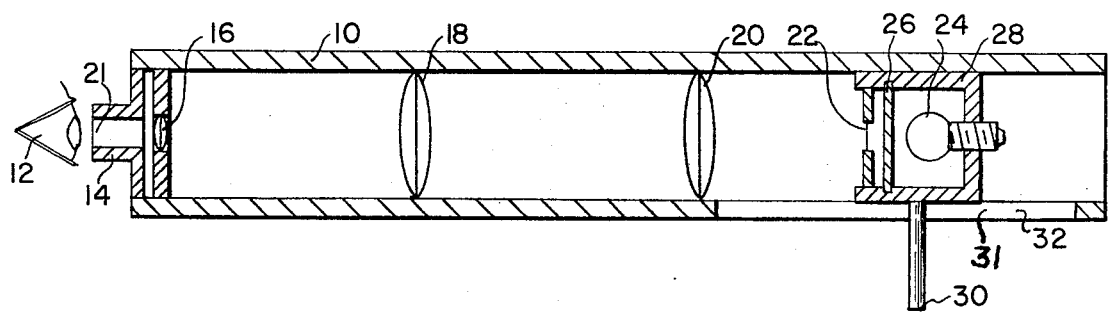
DAVID GUYTON
INVENTOR
BY
ATTORNEY

United States Patent Office 3,669,529
Patented June 13, 1972

3,669,529
OPTICAL SYSTEM FOR VARYING THE POWER RANGE AND SCALE SPACING IN A LENS MEASURING INSTRUMENT
David Guyton, Brookline, Mass.
(5505 Huntington Parkway, Bethesda, Md. 20014)
Filed Jan. 2, 1970, Ser. No. 234
Int. Cl. A61b 3/00, 3/02
U.S. Cl. 351—17         4 Claims

ABSTRACT OF THE DISCLOSURE

In an instrument for measuring the refractive power of lenses having a target, a scale, and a converging lens, an auxiliary lens system added to the converging lens is disclosed which allows manipulation of power range and scale spacing independently of one another.

BACKGROUND OF THE INVENTION

Field of the invention

The invention resides in the field of lens measuring instruments, in particular those instruments used for determining the power of optical lenses as well as those instruments, generally known as optometers, used for determining the refractive correction for the eye.

Description of the prior art

Instruments which are the subject of the present invention are well known in the prior art. They are based on the principle of using a target in conjunction with a converging lens to simulate, in a specified plane, a continuously variable lens having both converging and diverging power ranges. This simulated lens is used to neutralize the power of the lens under test, be it the power of an optical lens or the power error of the eye. The subject lens under test is positioned coincident with or near the plane of the simulated lens whose power is varied by moving the target along the scale until the condition of neutralization, that is, target focus or alignment, is detected by a viewing system through the subject lens.

In the case of optical lens measuring instruments the above named viewing system is most commonly a low power telescope used in conjunction with an observer's eye, the telescope serving to magnify greatly any deviation from the neutralization condition of focus or alignment. In the case of optometers this viewing system consists solely of that part of the subject's eye which causes parallel light rays to be imaged on the retina. The remainder of the subject's eye is the power error which is measured by neutralization.

Thus, as has been explained, lens measuring instruments, including optical lens measuring instruments and optometers, operate basically by simulating a continuously variable lens in a specified position. The power of this simulated lens is read from a scale on the instrument calibrated in diopters. The scales on optical lens measuring instruments indicate the opposite or negative of the power of the lens which the instrument simulates in order to read directly the power of the lens under test. The scales on optometers, on the other hand, usually indicate the actual power of the simulated lens, as this corresponds to the refractive correction for the eye.

In using a target in conjunction with a converging lens to simulate a continuously variable lens, the target is illuminated and is placed on the posterior side of the converging lens. The lens is usually fixed in position, and the target is axially movable. The position of the simulated lens is then most conveniently taken as coinciding with the anterior principal focus of the converging lens, as this results in a simulated lens whose power in diopters varies linearly with axial displacement of the target. It will be seen that the farther the target is moved away from the converging lens, the more positive becomes the power of the simulated lens, and the closer the target is moved toward the converging lens, the more negative becomes the power. Obviously there is a limit to the negative power attainable of the simulated lens. This limit is reached when the target is moved as close to the converging lens as possible. To obtain a wide range of negative simulated lens powers in instruments of this design it is necessary to use a converging lens of high power. This has the unfortunate effect, however, of shrinking the spacing of the calibrated scale along which the target is moved. For instance, a converging lens of +5.00 diopters might permit negative simulated lens powers from 0.00 to —5.00 diopters with a scale spacing of 4 cm. per diopter, while a +20.00 diopter converging lens would permit negative simulated lens powers from 0.00 to —20.00 diopters but with a scale spacing of only 0.25 cm. per diopter. Such a scale spacing of 0.25 cm. per diopter may be difficult to manufacture and difficult to read accurately.

The scale spacing in all lens measuring instruments of the above description, in which the position of the simulated lens is taken as coinciding with the anterior principal focus of the converging lens, is entirely determined by the power P in diopters of the converging lens. To be exact each diopter of power of the simulated lens corresponds to $1/P^2$ meters of spacing on the scale. Therefore, to obtain a wide scale spacing in such a lens measuring instrument one must use a converging lens of low power.

In using a converging lens of lower power, however, one is limited in prior art designs in the negative power obtainable in the simulated lens. The simulated lens has negative power whenever the target is between the converging lens and the posterior principal focus of the converging lens. In prior art designs, the distance between the converging lens and its posterior principal focus is equal to the focal length of the converging lens or $1/P$ meters. Thus, as was explained above, one diopter of power in the simulated lens is obtained for every displacement of $1/P^2$ meters on the scale, and a negative instrument power equal only to the power of the converging lens is obtained with prior art designs. Therefore, a low power converging lens, necessary for wide scale spacing, limits the negative power of the instrument.

SUMMARY OF THE INVENTION

The present invention may be summarized by stating that in a lens measuring device of the type described, the scale spacing and obtainable power range in the instrument may be independently varied by the addition of an auxiliary lens system to the converging lens such that the total lens system so formed has a posterior principal focus which is a selected distance from the outer lens of the lens system.

The scale spacing in such instruments, as explained above, is fixed by the chosen equivalent power of the lens system. The greatest simulated negative power, on the other hand is influenced by the equivalent power of the lens system, but is also determined by the chosen distance between the lens system and its posterior principal focus. For example, a converging lens of 10 diopters power with posterior principal focus 10 cm. from the lens will give a scale spacing of $1/P^2$ or $1/(10)^2$ meters per diopter or 1 cm. per diopter and a greatest simulated negative power of 10/1 or —10 diopters. On the other hand, a lens system of 10 diopters equivalent power with posterior principal focus 20 cm. from the lens system will give the same scale spacing of 1 cm. per diopter, but a greatest simulated negative power of 20/1 or —20.00 diopters.

The use of a lens system with posterior principal focus a greater distance from the system than the equivalent focal length of the system permits a wider scale spacing than has been otherwise obtainable in an instrument with a desired negative power range. This is highly desirable in instruments requiring non-critical observer adjustment such as those with a target moved directly by the hand of the observer. Such wide scale spacings are easier to manufacture and also permit reading the scale with greater accuracy.

On the other hand the use of a lens system with posterior principal focus a shorter distance from the system than the equivalent focal length of the system permits a narrower scale spacing than otherwise obtainable in an instrument with a desired negative power range. This is equally desirable in certain instrument designs having targets moving accurately over short distances. Such instruments may be designed very compactly for easy portability.

The foregoing summary of the present invention will become more apparent from the following detailed specification when read in conjunction with the accompanying drawing.

DESCRIPTION OF THE DRAWING

The figure is a cross-sectional view of an optometer employing one embodiment of the present invention.

DESCRIPTION OF THE PREFERRED EMBODIMENT

Referring to the drawing, there is shown a cross-sectional view of an optometer employing one embodiment of the present invention. The instrument is contained in tube 10 and mounted by any conventional means not shown. The lens to be measured in this case is the power error of the eye 12 located to the left of the eyepiece 14 and positioned at a known fixed distance from the eyepiece 14. The viewing system for determining the condition of neutralization in this arrangement consists of that part of the eye 12 which images parallel rays onto the retina. It is to be understood that the lens to be measured could just as easily be an optical lens, in which case the viewing system, not shown, would consist of a low power telescope in conjunction with an observer's eye, positioned at a convenient distance to the left of said optical lens.

The converging lens 16 mounted in eyepiece 14 and the converging lenses 18 and 20 mounted in tube 10 all combine to form a lens system with anterior principal focus at point 21 on the optical axis of the instrument, said point being a selected distance from the eye 12. This selected distance is commonly known as the vertex distance of refraction, or the distance from the eye at which a corrective spectacle lens is placed in normal use. By calibrating the instrument to this point, a linear scale in diopters of correction is obtained.

Target 22, along with illuminating means 24, a light bulb for example, and diffusing plate 26, is mounted in holder 28 mounted slideably in tube 10. The target may be moved axially by means of handle 30 attached to holder 28 and extending through slot 32 in tube 10. A scale 31 is attached to the exterior of tube 10 along slot 32 for the purpose of indicating at each position of target 22 the lens power which the instrument simulates at point 21.

In use the target 22 is moved axially until it appears to be in focus to the eye which is being corrected. At this point the power of the appropriate spectacle lens is read from the scale of the instrument.

Either lens 16, 18, or 20 in the present embodiment may be considered the converging lens found in prior art optometer designs with the remaining two lenses being the auxiliary lens system called for in the present invention for the purpose of combining with the original converging lens to form a lens system with the desired properties. For instance, consider lens 20 to be the converging lens found in prior art instrument designs.

Lenses 16 and 18 in the present embodiment are positioned for ease of explanation such that their adjacent principal focal planes coincide, forming a telescopic system of two lenses. Lens 20 is positioned a fixed non-specific distance from lens 18. The anterior principal focus of this three-lens system is at point 21 as previously specified. The posterior principal focus, an the other hand, will be that axial point at which rays parallel to the optical axis traveling from left to right are imaged. Since parallel rays entering a telescopic system, i.e., lenses 16 and 18, leave that system parallel, it is evident that the posterior principal focus of this three-lens system will coincide with the posterior principal focus of lens 20 acting alone which focus is $1/P_{20}$ meters from the lens system. The equivalent power of this three-lens system, however, is not equal to the power of lens 20 acting alone but is equal to this power multiplied by the power of the telescope or $(P_{20})(P_{16}/P_{18})$. Thu the equivalent focal length of the three-lens system is $(1/P_{20})(P_{18}/P_{16})$ meters.

If lens 16 has twice the power of lens 18, for example, a telescope with a power of two is formed, and the equivalent power of the three-lens system is twice the power of lens 20 alone or $2P_{20}$ resulting in an equivalent focal length of $1/2P_{20}$ meters. Thus the posterior principal focus of the system, $1/P_{20}$ meters from the lens system, is $$\frac{\frac{1}{P_{20}}}{\frac{1}{2P_{20}}}$$

or twice the equivalent focal length from lens 20.

If $P_{20}$ is 5 diopters in this example, the equivalent power of the three 3-lens system is $(P_{20})(P_{16}/P_{18})$ or $(5)(2)$ or 10 diopters resulting in a scale spacing of $1/(10)^2$ meters per diopter or 1 cm. per diopter. The posterior principal focus of the three-lens system, or the point on the scale which corresponds to 0.00 diopter of simulated lens power, is $1/P_{20}$ or $1/5$ meters of 20 cm. from lens 20. Therefore, with this 20 centimeters of available target movement from the posterior principal focus towards the lens system, a maximum simulated negative lens power of $(20)(-1$ diopter/cm.) or $-20$ diopters is obtained. Thus, a negative power range of 20 diopters is obtained with a scale spacing of 1 cm. per diopter. With prior art arrangements, a negative power range of 20 diopters could only have been obtained by using a converging lens of $+20$ or more diopters power resulting in a scale spacing of not greater than $1/(20)^2$ meters per diopter or 0.25 cm. per diopter.

The above specified example is used to illustrate the purpose of using such lens systems in lens measuring instruments of the type described. A variety of lens systems may be used for this purpose with the chosen equivalent power of the system determining the scale spacing and the chosen position of the posterior principal focus determining the available negative power range. Either wide or narrow scale spacings with a given negative power range may be desirable in certain such instruments for reasons specified earlier. The present invention provides means to independently vary these two parameters to obtain the desired result.

What is claimed is:

1. In an instrument for measuring the refractive power of a subject lens in combination:
 a converging lens;
 means for positioning said subject lens on the anterior side of said converging lens;
 a target movable axially on the posterior side of said converging lens for determining the refractive power of said subject lens;
 auxiliary lens means positioned between said subject lens and said target and forming in combination with said converging lens a lens system whose posterior principal focus is located a chosen distance from said lens system, said chosen distance substantialy different from the equivalent focal length of said lens system; and a scale for indicating the relative position of said target and said lens system, said scale having a plurality of spaced apart indicators, said indicators having a value dependent upon the equivalent power of said lens system, said values indicative of said subject lens refractive power.

2. The apparatus of claim 1 wherein said chosen distance is greater than said equivalent focal length, permitting a more widely spaced scale over a greater negative power range than otherwise obtainable.

3. The apparatus of claim 1 wherein said chosen distance is less than said equivalent focal length, permitting a more narrowly spaced scale over a given power range, requiring less target movement and thus permitting a more compact instrument than otherwise obtainable.

4. The apparatus of claim 1 wherein said auxiliary lens means comprises a telescopic lens system positioned anterior to said converging lens.

References Cited

Donald Whitney, "An Automatic Focusing Device for Ophthalmic Lenses," American Journal of Optometry and Archives of American Academy of Optometry, vol. 35, No. 4, April 1958, pp. 182–190.

DAVID SCHONBERG, Primary Examiner

P. A. SACHER, Assistant Examiner

U.S. Cl. X.R.

351—6, 13, 34

UNITED STATES PATENT OFFICE
CERTIFICATE OF CORRECTION

Patent No. 3,669,529             Dated   June 13, 1972

Inventor(s)  David Guyton

It is certified that error appears in the above-identified patent and that said Letters Patent are hereby corrected as shown below:

Column 4, line 17 - "Thu" should be "Thus"

Column 4, line 41 - "of 20 cm" should be "or 20 cm"

Signed and sealed this 19th day of February 1974.

(SEAL)
Attest:

EDWARD M. FLETCHER, JR.
Attesting Officer

C. MARSHALL DANN
Commissioner of Patents